United States Patent
Toderici et al.

(10) Patent No.: US 8,537,175 B1
(45) Date of Patent: Sep. 17, 2013

(54) VIDEO ENHANCEMENT FOR LARGE SCALE APPLICATIONS

(75) Inventors: George Toderici, Mountain View, CA (US); Jay Yagnik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 966 days.

(21) Appl. No.: 12/625,822

(22) Filed: Nov. 25, 2009

Related U.S. Application Data (60) Provisional application No. 61/176,350, filed on May 7, 2009.

(51) Int. Cl.
- G09G 5/02 (2006.01)
- G06T 15/50 (2011.01)
- G06T 15/60 (2006.01)

(52) U.S. Cl.
USPC .......................................................... 345/591

(58) Field of Classification Search
USPC ................................................ 345/591, 426
See application file for complete search history.

(56) References Cited

U.S. PATENT DOCUMENTS

| | | | | |
|---|---|---|---|---|
| 5,870,505 | A * | 2/1999 | Wober et al. | 382/274 |
| 6,741,295 | B2 * | 5/2004 | Nieuwenhuizen et al. | 348/687 |
| 6,937,287 | B2 * | 8/2005 | Gai et al. | 348/379 |
| 2002/0171852 | A1 * | 11/2002 | Zhang et al. | 358/1.9 |
| 2006/0285754 | A1 * | 12/2006 | Steinberg et al. | 382/224 |
| 2007/0183678 | A1 * | 8/2007 | Sankar et al. | 382/254 |
| 2007/0269132 | A1 * | 11/2007 | Duan et al. | 382/274 |
| 2008/0055681 | A1 * | 3/2008 | Li | 358/520 |
| 2008/0232765 | A1 * | 9/2008 | Patten et al. | 386/52 |
| 2009/0009665 | A1 * | 1/2009 | Tsutsumi et al. | 348/674 |
| 2009/0041375 | A1 * | 2/2009 | Cohen et al. | 382/274 |
| 2009/0086814 | A1 * | 4/2009 | Leontaris et al. | 375/240.02 |

* cited by examiner

Primary Examiner — David T Welch
(74) Attorney, Agent, or Firm — Fenwick & West LLP

(57) ABSTRACT

A video enhancement server enhances a video. A scene segmentation module detects scene boundaries and segments the video into a number of scenes. For each frame in a given scene, a local white level and a local black level are determined from the distribution of pixel luminance values in the frame. A global white level and global black level are also determined from the distribution of pixel luminance values throughout the scene. Weighted white levels and black levels are determined for each frame as a weighted combination of the local and global levels. The video segmentation server then applies histogram stretching and saturation adjustment to each frame using the weighted white levels and black levels to determine enhanced pixel luminance values. An enhanced video comprising the enhanced pixel luminance values is stored to a video server for serving to clients.

21 Claims, 4 Drawing Sheets

VIDEO ENHANCEMENT FOR LARGE SCALE APPLICATIONS

CROSS-REFERENCE TO RELATED APPLICATION

This application claims the benefit of U.S. Provisional Application No. 61/176,350 filed on May 7, 2009, which is incorporated by reference herein in its entirety.

BACKGROUND

1. Field of the Invention

This invention generally relates to processing video and more specifically to enhancing video.

2. Description of the Related Art

The sharing of video content on websites has developed into a worldwide phenomenon, supported by dozens of websites. Many thousands of videos are posted every day, and this number is increasing as the tools and opportunities for capturing video become easier to use and more widespread. Millions of people watch the posted videos.

Uploaded videos are often of poor visual quality because many videos are captured under poor lighting conditions or using inexpensive cameras. Particularly, the contrast of uploaded videos is often low, making foreground objects difficult to distinguish from other objects and from the background. Thus, there is a need to process the uploaded videos to enhance contrast and make the videos more visually appealing.

Conventional image enhancement techniques such as histogram stretching or histogram equalization improve image quality by determining a histogram of pixel luminance values for an individual image frame, and stretching the histogram over an increased range of luminance values. These conventional image enhancement techniques can be extended to video by applying image enhancement independently to each individual frame of the video. However, conventional video enhancement techniques often corrupt video transition effects and introduces unwanted artifacts into the video. In addition, conventional video enhancement techniques are not well-suited for large scale applications such as video sharing, because of the substantial computational burden involved in processing every frame of video individually. Therefore, there is a need for a video enhancement technique that is well suited for large scale applications.

SUMMARY

In a first embodiment, the above and other needs are met by a method for enhancing a video. A scene of video having a plurality of frames is identified. A global distribution of luminance values of pixels in the scene is determined. Pixels in a frame within the scene are enhanced based at least in part on the global distribution of luminance values for pixels in the scene and a local distribution of luminance values for pixels in the frame. The enhanced video having the enhanced pixel luminance values is outputted.

In one embodiment, the step of enhancing the pixels comprises determining a local white level and local black level from the local distribution of pixel luminance values in the frame. A weighted white level is determined as a weighted combination of a global white level from the global distribution of pixel luminance values in the scene and the local white level from the local distribution of pixel luminance values in the frame. Similarly, a weighted black level is determined as a weighted combination of the global black level from the global distribution of pixel luminance values in the scene and the local black level from the local distribution of pixel luminance values in the frame. The luminance values are enhanced using the weighted white levels and weighted black levels.

A second embodiment comprises a computer-readable storage medium storing computer executable computer program instructions for enhancing video using the steps described above.

A third embodiment comprises a computer system for enhancing video. The computer system includes a computer-readable storage medium storing executable computer program instructions for enhancing video using the steps described above. The computer system further comprises a processor configured to execute the computer program instructions stored on the computer-readable storage medium.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
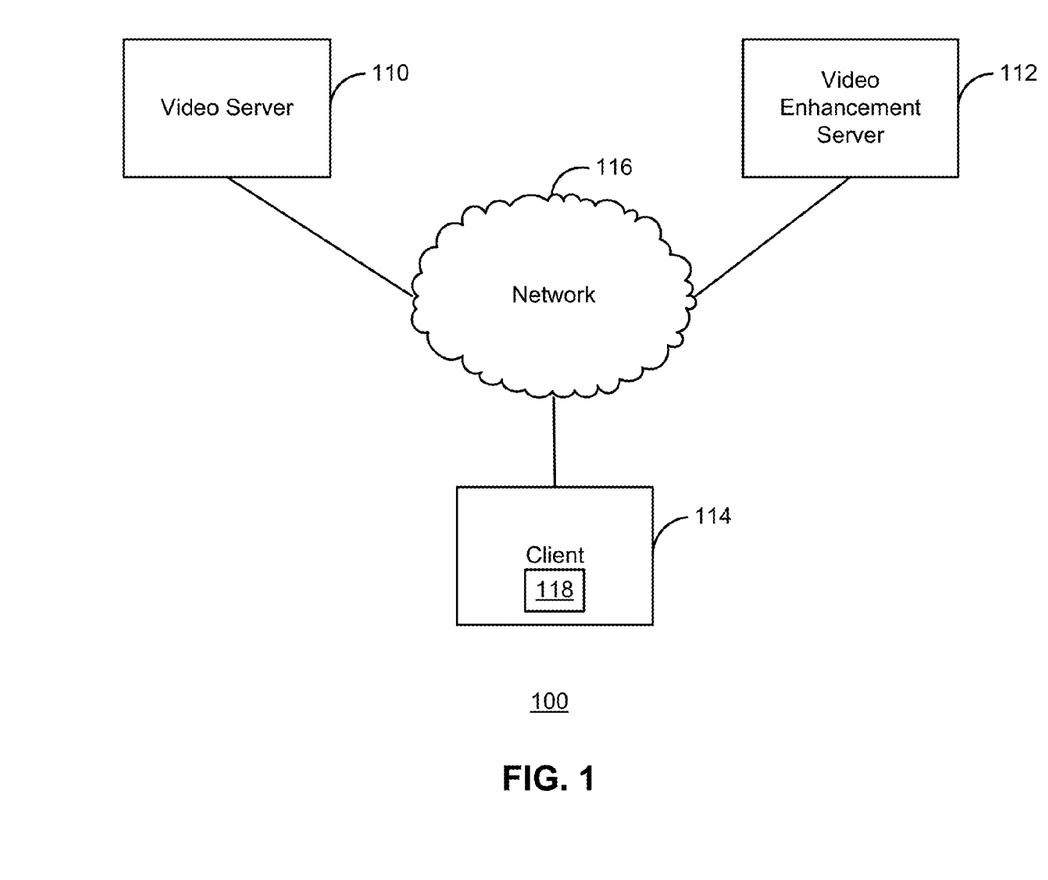
FIG. 1 is a high-level block diagram of a computing environment according to one embodiment.

FIG. 1 is a high-level block diagram of a computing environment 100 according to one embodiment. FIG. 1 illustrates a video server 110, an enhancement server 112, and a client 114 connected by a network 116. Only one client 114 is shown in FIG. 1 in order to simplify and clarify the description. Embodiments of the computing environment 100 can have thousands or millions of clients 114, as well as multiple video servers 110 and enhancement servers 112.

The video server 110 serves video content (referred to herein as "videos") to clients 114 via the network 116. In one embodiment, the video server 110 is located at a website provided by YOUTUBE, LLC of San Bruno, Calif., although the video server can also be provided by another entity. The video server 110 includes a database storing multiple videos and a web server for interacting with clients 114. The video server 110 receives requests from users of clients 114 for the videos in the database and serves the videos in response. In addition, the video server 110 can receive, store, and serve videos posted by users of the clients 114 and by other entities.

The video enhancement server 112 applies video enhancement to received videos (e.g., from the video server 110). The video enhancement server 112 generally increases contrast of the video by scaling pixel intensity or luminance values such that disparity between the minimum (i.e. darkest) value and the maximum (i.e. lightest) value is increased. The video enhancement server 112 applies enhancement on a scene-by-scene basis, or as a combination of frame-by-frame and scene-by-scene. The enhanced videos are saved to the video server 110 for serving to the client 114. A process for video enhancement performed by the video enhancement server 112 is described in more detail below with reference to FIG. 4.

The client 114 is a computer or other electronic device used by one or more users to perform activities including viewing videos and other content received from the video server 110. The client 114, for example, can be a personal computer executing a web browser 118 that allows the user to browse and search for videos available at the video server web site. Alternatively, the client 114 can view videos in an embedded video player on web sites other than the web site hosting the video server 110. In other embodiments, the client 114 is a network-capable device other than a computer, such as a personal digital assistant (PDA), a mobile telephone, a pager, a television "set-top box," etc.

The network 116 enables communications among the entities connected to it. In one embodiment, the network 116 is the Internet and uses standard communications technologies and/or protocols. Thus, the network 116 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 116 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 116 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

Figure 2:
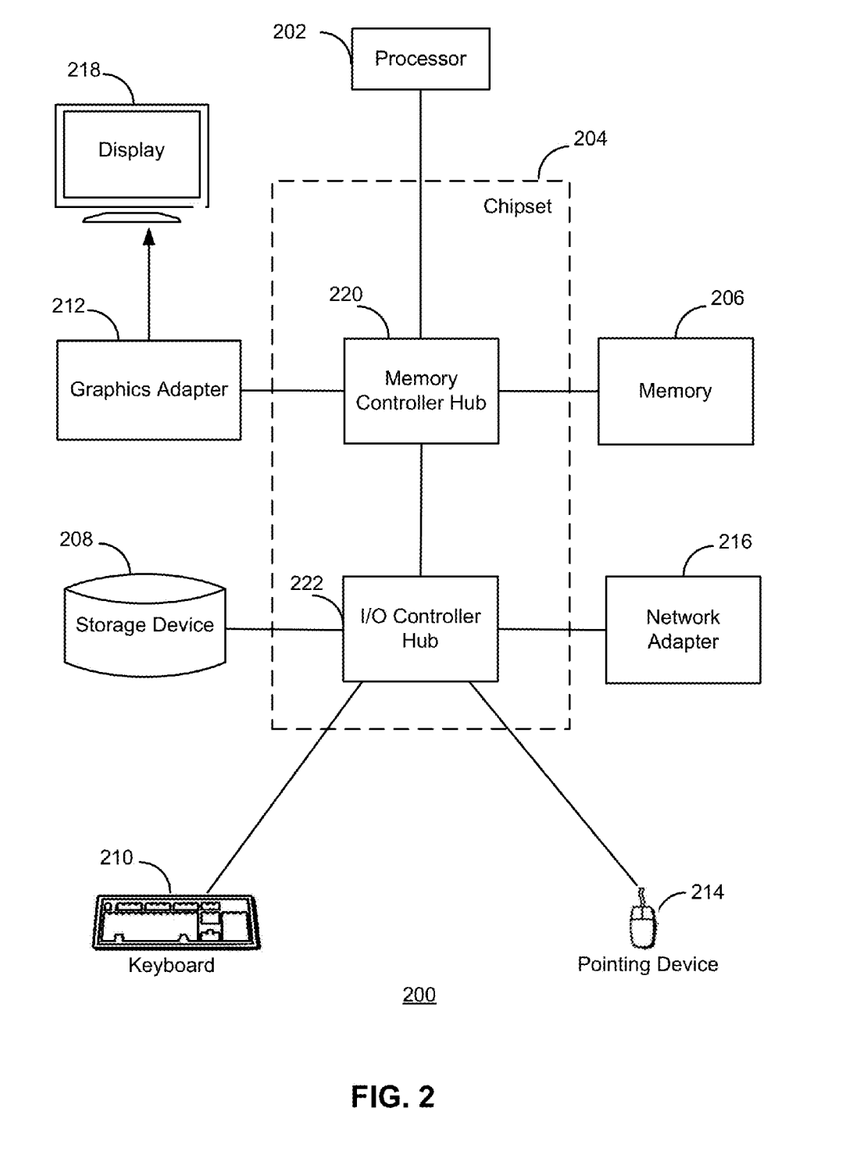
FIG. 2 is a high-level block diagram illustrating an example of a computer for use as a video server, enhancement server, and/or client.

FIG. 2 is a high-level block diagram illustrating an example of a computer 200 for use as a video server 110, enhancement server 112, and/or client 114. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display device 218. The network adapter 216 couples the computer system 200 to the network 116. Some embodiments of the computer 200 have different and/or other components than those shown in FIG. 2.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The types of computers 200 used by the entities of FIG. 1 can vary depending upon the embodiment and the processing power used by the entity. For example, a client 114 that is a mobile telephone typically has limited processing power, a small display 218, and might lack a pointing device 214. The enhancement server 112, in contrast, may comprise multiple blade servers working together to provide the functionality described herein.

Figure 3:
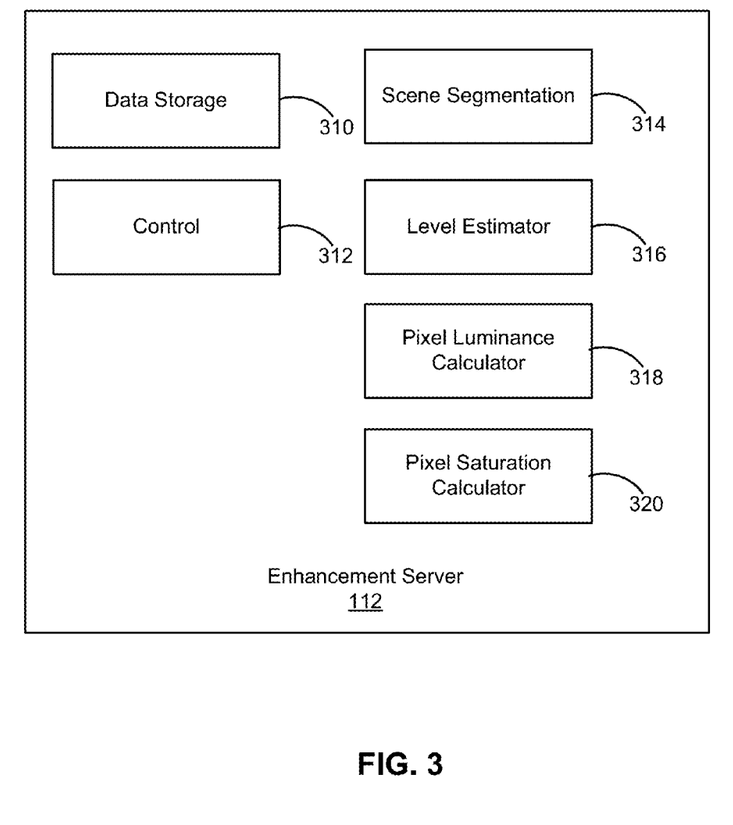
FIG. 3 is a high-level block diagram illustrating modules within the enhancement server according to one embodiment.

FIG. 3 is a high-level block diagram illustrating modules within the enhancement server 112 according to one embodiment. Some embodiments of the enhancement server 112 have different and/or additional modules than the ones described here. Similarly, the functions can be distributed among the modules in a different manner than is described here. Certain modules and functions can be incorporated into other modules of the enhancement server 112 and/or other entities on the network 116, including the video server 110 and client 114.

A data storage module 310 stores data used by the various modules of the enhancement server 112. The stored data include videos undergoing enhancement, frames and/or other portions of videos being operated upon, parameters related to the enhancement process, and data created during the enhancement process.

A control module 312 controls the operation of the enhancement server 112. In one embodiment, an administrator of the enhancement server 112 interacts with the control module 312 to select various enhancement parameters as will be described below. In one embodiment, the control module 312 can provide a graphical user interface to an administrator for enabling these interactions. The control module 312 controls the various modules of the enhancement server 112 (e.g., the scene segmentation module 314, level estimator 316, pixel luminance calculator 318, and pixel saturation calculator 320) to enhance scenes of video and store the enhanced video to the video server 110. The control module 312 controls the various modules of the enhancement server 112 to enhance the scene of video based on a global distribution of pixel luminance values throughout the scene and local distributions of pixel values for each frame within the scene.

The scene segmentation module 314 segments a video into scenes. Each scene comprises a sequence of image frames between scene boundaries. A scene boundary represents a change in video content, such as when a video switches from one camera angle to another (i.e. a cut), when the scene slowly fades to black and a new scene begins (i.e. a fade), when a first scene slowly transitions into a second scene (i.e. a dissolve), or any other type of transition between scenes. The scene segmentation module 314 analyzes video content to identify transitions indicative of the scene boundaries in the video. The scene segmentation module 314 then stores the temporal locations of the scene boundaries within the video to the data storage 310.

The level estimator 316 receives a scene of video and outputs local white levels and locals black levels for each frame of the scene based on the local distribution of luminance values for pixels in the frame. The local white level correspond to a pixel luminance value set such that a predefined percentage of pixels (e.g., 99.5%) in the frame have a lower luminance value than the local white level. Similarly, the local black level corresponds to a pixel luminance value such that a different predefined percentage of pixels (e.g., 0.5%) have a lower luminance value than the local black level. The level estimator 316 furthermore determines a global white level and a global black level based on the global distribution of luminance values throughout the entire scene. In one embodiment, the level estimator 316 determines weighted black levels and white levels for each frame based on the weighted combination of the local and global levels. The weighted white levels and black levels are stored to the data storage 310 and are used by the pixel luminance calculator 318 to enhance the scenes of video. A process for estimating white levels and black levels by the level estimator 316 is described in more detail below with reference to FIG. 4.

The pixel luminance calculator 318 receives frames of video and determines output luminance values for the pixels in the enhanced video based on the input luminance values of the pixels within the frames, the estimated white and black levels, and various operator defined parameters. In one embodiment, output luminance values for a frame are determined based on a weighted combination of the estimated white and black levels for the individual frame, and estimated white and black levels for the entire scene containing the frame. A process for determining output luminance values by the luminance calculator 318 is described in more detail below with reference to FIG. 4.

The pixel saturation calculator 320 receives frames of video and determines output saturation values for the pixels in the enhanced video based on the input saturation values, the output luminance values, and various operated defined parameters. The pixel saturation calculator 320 adjusts saturation values to compensate for a perceived decrease in saturation resulting from an increase in luminance. A process for determining output saturation values by the saturation calculator 320 is described in more detail below with reference to FIG. 4.

Figure 4:
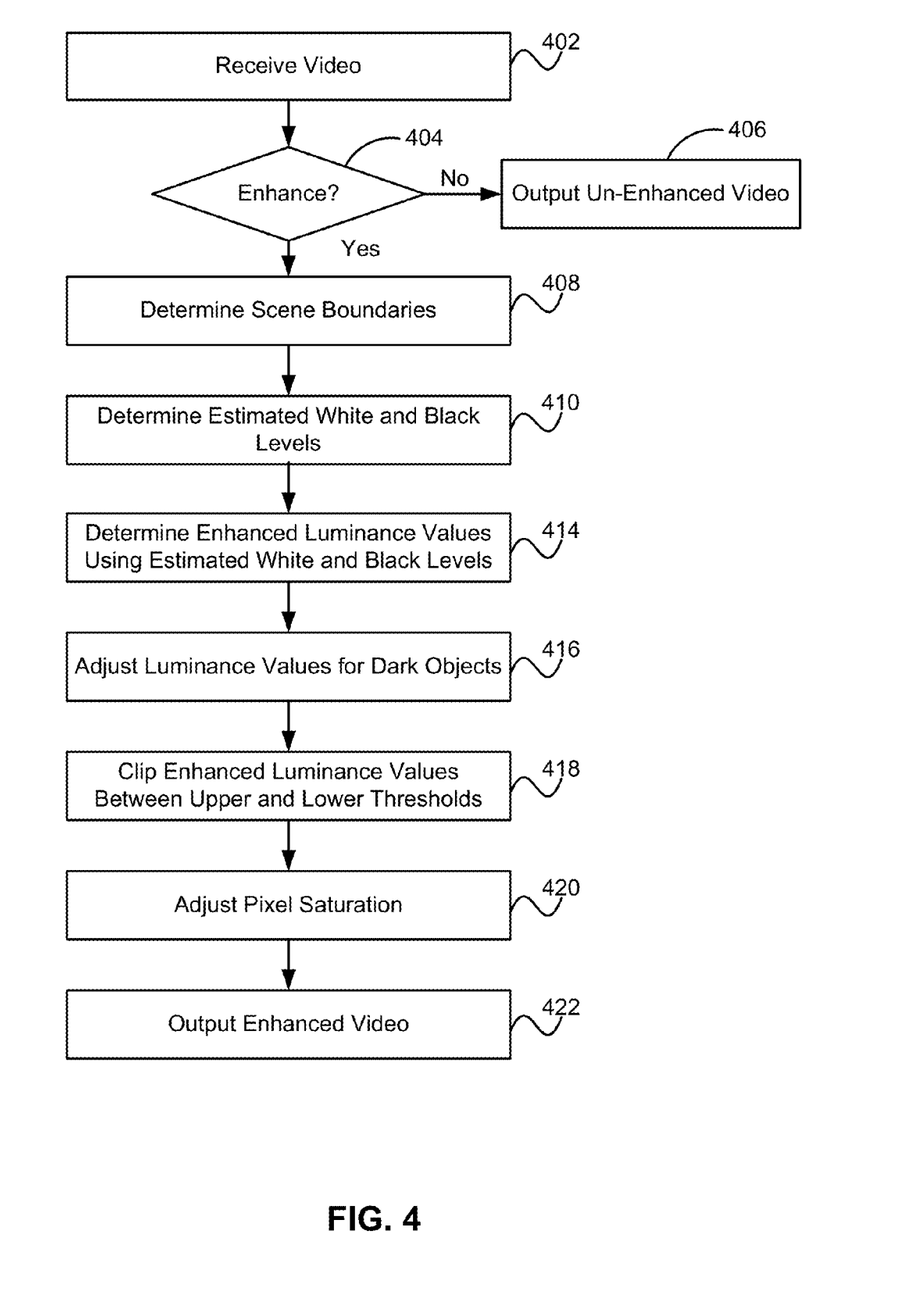
FIG. 4 is a flowchart illustrating steps performed by the enhancement server to enhance a video according to one embodiment.

FIG. 4 illustrates an embodiment of a process for video enhancement performed by the enhancement server 112. The enhancement server 112 receives 402 a video and determines 404 whether or not the video meets criteria for enhancement. For example, in one embodiment, the enhancement server 112 determines not to apply enhancement to a video if the enhancement process would not actually improve the video quality in a visually perceivable manner. In one embodiment, the video enhancement server 112 determines the difference between the maximum and minimum luminance values of the pixels in the video (i.e. a dynamic range of the luminance values). If the difference is large enough that video enhancement would not be able to substantially increase contrast of the video, then the enhancement server 112 determines not to enhance the video and outputs 406 an un-enhanced video. Furthermore, if there are fewer than a threshold number of unique luminance values in the video (e.g., ten unique luminance values) then the enhancement server 112 determines not to enhance the video and outputs 406 an un-enhanced video. Thus, the enhancement server 112 improves its computational efficiency by skipping over videos that cannot be substantially enhanced. In alternative embodiments, the decision 402 of whether or not to continue with the enhancement occurs at a different point in the process. For example, the enhancement server 112 may analyze information determined during subsequent processing steps described below and end the enhancement process if it decides that continuing will not substantially improve the video quality.

If the enhancement server 112 decides that the video should be enhanced, the scene segmentation module 314 determines 408 scene boundaries for the received video. In practice, the scene segmentation module 314 may not be 100% accurate and may produce either an over-segmentation or an under-segmentation of the video. In one embodiment, the scene segmentation module 314 is tuned to err on the side of over-segmentation rather than under-segmentation.

The level estimator 316 determines 410 an estimated white level and an estimated black level for each frame of video within a scene. In one embodiment, each frame of video comprises a two-dimensional grid of pixels having a height and a width. Each pixel is identified by its x,y coordinates in the grid where $x \in \{0, \ldots, \text{width}\}$ and $y \in \{0, \ldots, \text{height}\}$. The visual characteristics of a given pixel are represented by a one or more values dependent on the color space being utilized. For example, in a Red-Green-Blue (RGB) color space, a pixel, $I(x, y)$, is defined by a triplet representing the red, green, and blue components of the pixel's color. Thus, in the RGB color space, $I(x, y) \in \{0, 1, \ldots, N\}^3$ where N defines the number of discrete colors (e.g., N=255) on each of the red, green, and blue axes. In the Hue-Saturation-Value (HSV) color space, each pixel $I(x, y)$ is instead represented by a triplet corresponding to the hue, saturation, and value components of the pixel's color. Other color space representations are also possible such as, for example, YUV, HSL, La*b*, and so on. Conversion between color space representations are possible by applying various transformations to the pixel representation. For the purpose of the disclosure herein, it is assumed that the pixels are represented in the HSV color space. However, the techniques can also apply to other color space representations, or videos can be converted from their native representation to the HSV color space for processing.

Assuming that each pixel $I(x, y)$ in a given image frame I is defined according to an HSV representation, a probability mass function for V is given by:

$$P(k) = Pr(V(x, y) = k), \sum_k P(k) = 1 \qquad (1)$$

The probably mass function $P(k)$ represents the probability that the V component of a randomly selected pixel $I(x, y)$ in a given image frame will be a particular value k. This probability is determined from the actual distribution of pixel values within the image frame. The cumulative distribution function (CDF) of V is:

$$C(k) = \sum_{i=0}^{k} P(i), k \in \{0, \ldots, N\} \qquad (2)$$

The cumulative distribution function $C(k)$ represents the probability that the V component of a randomly selected pixel $I(x, y)$ will be equal to or less than a particular value k, according to the actual statistics of pixel values within the image frame. The cumulative distribution function $C(k)$ is used in one embodiment to determine estimated white levels and estimated black levels for each image frame. For example, in one embodiment, an estimate of the local white level $w_{frame}$ for a given image frame is determined such that $C(w_{frame}) = 0.995$. In other words, the local white level $w_{frame}$ for the image frame is chosen such that 99.5% of pixels in the image frame have a value V equal to or less than $w_{frame}$, based on the local distribution of pixel luminance values in the frame. Similarly, in one embodiment, an estimate for the local black level $b_{frame}$ is determined such that $C(b_{frame}) = 0.005$. In other words, a local black level $b_{frame}$ is chosen such that 0.5% of pixels in the image frame have a value V equal to or less than $b_{frame}$, based on the local distribution of pixel luminance values in the frame. In other embodiments, different values are used to set the local white level $w_{frame}$ and local black level $b_{frame}$. In one embodiment, for convenience of processing, the local black level $b_{frame}$ and local white level $w_{frame}$ are normalized to the interval [0 . . . 1] instead of [0 . . . N]. Thus, for example, in one embodiment $b_{frame}$=0.005 and $w_{frame}$=0.995. For compatibility, in this embodiment, other variables discussed below are also normalized from the interval [0 . . . N] to the interval [0 . . . 1].

The level estimator 316 also determines 410 global white levels and black levels for each scene, denoted by $w_{scene}$ and $b_{scene}$ respectively. The global black level $b_{scene}$ for a given scene represents a value of V normalized to the interval [0 . . . 1] such that a first predefined percentage (e.g., 0.5%) of the normalized V components for all the pixels in the scene are less than or equal to $b_{scene}$, based on the global distribution of pixel luminance values in the scene. In one embodiment, the global black level $b_{scene}$ for the scene can be determined by computing an average of the local black levels for each frame in the scene. Thus, the global black level $b_{scene}$ for a given scene is computed as:

$$b_{scene} = \frac{\sum_{i=I_{start}}^{I_{end}} b\_frame_i}{I_{end} - I_{start}} \quad (3)$$

where $I_{start}$ and $I_{end}$ are frame indices corresponding to the scene boundaries (starting frame and ending frame) of the scene, and $b\_frame_i$ is the local black level of a frame i within the scene. Alternatively, the black level for a scene $b_{scene}$ can be computed directly from the statistics of pixel values across the entire scene using equations (1) and (2) above.

The global white level $w_{scene}$ for a scene is computed similarly. For example, in one embodiment, the global white level $w_{scene}$ represents a value of V normalized to the interval [0 . . . 1] such that a second predefined percentage (e.g., 99.5%) of the normalized V components for all the pixels in the scene are less than or equal to $w_{scene}$, based on the global distribution of pixel luminance values in the scene. The global white level $w_{scene}$ for the scene can be determined by computing an average of the estimated white levels for each frame in the scene. Thus, the global white level $w_{scene}$ for a given scene is given by:

$$w_{scene} = \frac{\sum_{i=I_{start}}^{I_{end}} w\_frame_i}{I_{end} - I_{start}} \quad (4)$$

Alternatively, the global white level for a scene $w_{scene}$ can be computed directly from the statistics across the entire scene using equations (1) and (2) above.

In one embodiment, the level estimator 316 determines 410 a weighted black level estimate $b_{est}$ and a weighted white level estimate $W_{est}$ as a compromise between the local levels for each frame and the global level for the scene. For example, in one embodiment, a parameter, $a_b$ for a given frame having an local black level $b_{frame}$ within a given scene having an global black level $b_{scene}$ is computed by:

$$\alpha_b = [1 - |b_{scene} - b_{frame}|]^{\gamma_{frame}} \quad (5)$$

where parameter $\gamma_{frame}$ determines how much influence the local frame-level estimate $b_{frame}$ has over the global scene-level estimate $b_{scene}$. In one embodiment, $\gamma_{frame}$ is set to 0.5. Using the parameter $\alpha_b$, an estimated weighted black level for a frame is computed from a weighted combination of the local black level $b_{frame}$ and global black level $b_{scene}$ as:

$$b_{est} = \alpha_b b_{frame} + (1 - \alpha_b) b_{scene} \quad (6)$$

Similarly, an estimated white level $w_{est}$ is determined from a weighted combination of the local white level $w_{frame}$ and global white level $w_{scene}$ using equations (7) and (8) as follows:

$$\alpha_w = [1 - |w_{scene} - w_{frame}|]^{\gamma_{frame}} \quad (7)$$

$$w_{est} = \alpha_w w_{frame} + (1 - \alpha_w) w_{scene} \quad (8)$$

Using the weighted white level and black level, the pixel luminance calculator 318 determines 414 an output luminance value $l_{out}$ for each pixel. For example, in one embodiment, the pixel luminance calculator 318 applies a histogram stretching to the original input pixel values $l_{in}$ such that a stretched distribution of the output luminance values $l_{out}$ in the frame have a desired white level $w_d$ higher in luminance than the weighted white level $w_{est}$, and a desired black level $b_d$ lower in luminance than the weighted black level $b_{est}$. Typically, the desired white level $w_d$ and the desired black level $b_d$ are chosen such that the output luminance values will cover the entire dynamic range of the color space in which the adjustment is made (e.g., $w_d$=1 and $b_d$=0 on the normalized scale). In one embodiment, an output pixel luminance is computed as:

$$l_{out} = \frac{l_{in} - b_{est}}{w_{est} - b_{est}} (w_d - b_d) + b_d \quad (9)$$

Advantageously, equation (9) is color-space independent and is very fast because it is a linear transform. If, for example, the pixel values are defined in the HSV color space as discussed above, then input luminance value $l_{in}$ corresponds to the V component of the original pixel, and the output luminance value $l_{out}$ corresponds to the V component of the output pixel.

In one embodiment, the enhancement server 112 adjusts 416 the output luminance $l_{out}$ in order to improve frames in which there is a high contrast between the foreground and the background, and the foreground object is dark relative to the background. Without this adjustment, the enhancement process may make a dark foreground object darker due to the increased contrast. The human eye perceives this change as a decrease in image quality because features of the dark object become harder to distinguish. In order to alleviate this problem, if the adjusted output luminance $l_{out}$ has a lower value than the original input luminance $l_{in}$, an adjusted output luminance value $l'_{out}$ is computed to raise the luminance value as follows:

$$l'_{out} = \begin{cases} l_{in} - |\delta_l|^{\gamma_1} & \text{if } \delta_l < 0; \\ l_{out} & \text{otherwise} \end{cases} \quad (10)$$

where $\delta_l = l_{out} - l_{in}$ and $\gamma_1$ is an experimentally determined parameter that controls the amount of correction. For example, in one embodiment, $\gamma_1$=4.

In one embodiment, the adjusted luminance value $l'_{out}$ is also clipped 418 between a lower threshold (e.g., 0) and an upper threshold (e.g., 1) by applying a clipping function to $l'_{out}$. For example, in one embodiment, a clipping function $\tau(v)$ is defined as:

$$\tau(v) = \begin{cases} 0 & \text{if } v < 0; \\ v & \text{if } 0 \leq v \leq 1; \\ 1 & \text{if } v > 1. \end{cases} \quad (11)$$

In one embodiment, the pixel saturation calculator 320 adjusts 420 the saturation component s of the pixel based on the output luminance value $l_{out}$. This saturation adjustment compensates for a perceived decrease in saturation that results from an increase in luminance. In order to preserve the perceived saturation, the saturation component of the pixel, $s_{out}$, is modified as follows:

$$S_{out} = \tau(S_{in} + \sigma \delta_l) \quad (12)$$

where $s_{in}$ is the saturation component of the original input pixel, $\tau$ is the clipping function described above in equation (11), $\delta_l = l_{out} - l_{in}$, and $\sigma$ is an experimentally determined parameter controlling the amount of saturation adjustment. In one embodiment, for example, $\sigma = 0.15$. The enhancement server 112 then outputs 422 the enhanced video.

Beneficially, the disclosed system and process can enhance the quality of a large number of videos, while not decreasing the quality of any processed videos. The method can be directly applied on a large scale for mass-processing of videos suitable for applications such as video hosting sites.

The above description is included to illustrate the operation of the embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method for enhancing a video comprising:
   determining scene boundaries in the video;
   identifying a scene of the video based on the scene boundaries, the identified scene having a plurality of frames bounded by two of the determined scene boundaries;
   determining a global distribution of luminance values of pixels throughout the plurality of frames in the identified scene;
   determining a local distribution of luminance values of pixels in a frame within the identified scene;
   determining a global white level and a global black level from the global distribution of luminance values of pixels throughout the plurality of frames in the identified scene;
   determining a local white level and a local black level from the local distribution of luminance values of the pixels within the frame;
   determining a weighted white level from a weighted combination of the local white level and the global white level;
   determining a weighted black level from a weighted combination of the local black level and the global black level;
   generating enhanced luminance values of the pixels in the frame of the identified scene using the weighted white level and the weighted black level; and
   outputting an enhanced video having the enhanced pixel luminance values.

2. The computer-implemented method of claim 1, wherein generating the enhanced luminance values of the pixels in the frame comprises:
   applying a histogram stretching to the pixel luminance values of the pixels in the frame to produce a stretched distribution of pixel luminance values having a specified white level higher in luminance than the weighted white level and a specified black level lower in luminance than the weighted black level.

3. The computer-implemented method of claim 1, wherein determining the global distribution of luminance values comprises:
   determining a global white level such that a first predefined percentage of the pixels in the identified scene have a luminance value lower than the global white level; and
   determining a global black level such that a second predefined percentage of the pixels in the identified scene have a luminance value lower than the global black level.

4. The computer-implemented method of claim 1, further comprising:
   raising the pixel luminance value of an enhanced pixel responsive to the enhanced pixel having a lower luminance value than an original luminance value of the pixel.

5. The computer-implemented method of claim 1, further comprising:
   clipping the enhanced pixel luminance values between a lower threshold and an upper threshold.

6. The computer-implemented method of claim 1, further comprising:
   adjusting a saturation component of a pixel in the frame proportionally to a difference between an original pixel luminance value and an enhanced pixel luminance value for the pixel in the frame.

7. The computer-implemented method of claim 1, further comprising:
   determining a dynamic range of the video; and
   determining whether or not to enhance the video based on the dynamic range.

8. A non-transitory computer-readable storage medium storing executable computer program instructions for enhancing a video, the computer program instructions when executed by a processor causing the processor to perform steps including:
   determining scene boundaries in the video;
   identifying a scene of the video based on the scene boundaries, the identified scene having a plurality of frames bounded by two of the determined scene boundaries;
   determining a global distribution of luminance values of pixels throughout the plurality of frames in the identified scene;
   determining a local distribution of luminance values of pixels in a frame within the identified scene;
   determining a global white level and a global black level from the global distribution of luminance values of pixels throughout the plurality of frames in the identified scene;
   determining a local white level and a local black level from the local distribution of luminance values of the pixels within the frame;
   determining a weighted white level from a weighted combination of the local white level and the global white level;
   determining a weighted black level from a weighted combination of the local black level and the global black level;

generating the enhanced luminance values of the pixels in the frame using the weighted white level and the weighted black level; and outputting an enhanced video having the enhanced pixel luminance values.

9. The non-transitory computer-readable storage medium of claim 8, wherein generating the enhanced luminance values of the pixels in the frame comprises:

applying a histogram stretching to the pixel luminance values of the pixels in the frame to produce a stretched distribution of pixel luminance values having a specified white level higher in luminance than the weighted white level and a specified black level lower in luminance than the weighted black level.

10. The non-transitory computer-readable storage medium of claim 8, wherein determining the global distribution of luminance values comprises:

determining a global white level such that a first predefined percentage of the pixels in the identified scene have a luminance value lower than the global white level; and determining a global black level such that a second predefined percentage of the pixels in the identified scene have a luminance value lower than the global black level.

11. The non-transitory computer-readable storage medium of claim 8, the instructions when executed further causing the processor to perform steps of:

raising the pixel luminance value of an enhanced pixel responsive to the enhanced pixel having a lower luminance value than an original luminance value of the pixel.

12. The non-transitory computer-readable storage medium of claim 8, the instructions when executed further causing the processor to perform steps of:

clipping the enhanced pixel luminance values between a lower threshold and an upper threshold.

13. The non-transitory computer-readable storage medium of claim 8, the instructions when executed further causing the processor to perform steps of:

adjusting a saturation component of a pixel in the frame proportionally to a difference between an original pixel luminance value and an enhanced pixel luminance value for the pixel in the frame.

14. The non-transitory computer-readable storage medium of claim 8, the instructions when executed further causing the processor to perform steps of:

determining a dynamic range of the video; and determining whether or not to enhance the video based on the dynamic range.

15. A computer system for enhancing video, the computer system comprising:

a non-transitory computer-readable storage medium storing executable computer program instructions for enhancing video, the computer program instructions comprising instructions for:

determining scene boundaries in the video;

identifying a scene of the video based on the scene boundaries, the identified scene having a plurality of frames bounded by two of the determined scene boundaries;

determining a global distribution of luminance values of pixels throughout the plurality of frames in the identified scene;

determining a local distribution of luminance values of pixels in a frame within the identified scene;

determining a global white level and a global black level from the global distribution of luminance values of pixels throughout the plurality of frames in the identified scene;

determining a local white level and a local black level from the local distribution of luminance values of the pixels within the frame;

determining a weighted white level from a weighted combination of the local white level and the global white level;

determining a weighted black level from a weighted combination of the local black level and the global black level;

generating the enhanced luminance values of the pixels in the frame using the weighted white level and the weighted black level; and outputting an enhanced video having the enhanced pixel luminance values; and a processor configured to execute the computer program instructions stored on the computer-readable storage medium.

16. The computer system of claim 15, wherein generating the enhanced luminance values of the pixels in the frame comprises:

applying a histogram stretching to the pixel luminance values of the pixels in the frame to produce a stretched distribution of pixel luminance values having a specified white level higher in luminance than the weighted white level and a specified black level lower in luminance than the weighted black level.

17. The computer system of claim 15, wherein determining the global distribution of luminance values comprises:

determining a global white level such that a first predefined percentage of the pixels in the identified scene have a luminance value lower than the global white level; and determining a global black level such that a second predefined percentage of the pixels in the identified scene have a luminance value lower than the global black level.

18. The computer system of claim 15, wherein the non-transitory computer-readable storage medium further comprises instructions for:

raising the pixel luminance value of an enhanced pixel responsive to the enhanced pixel having a lower luminance value than an original luminance value of the pixel.

19. The computer system of claim 15, wherein the non-transitory computer-readable storage medium further comprises instructions for:

clipping the enhanced pixel luminance values between a lower threshold and an upper threshold.

20. The computer system of claim 15, wherein the non-transitory computer-readable storage medium further comprises instructions for:

adjusting a saturation component of a pixel in the frame proportionally to a difference between an original pixel luminance value and an enhanced pixel luminance value for the pixel in the frame.

21. The computer system of claim 15, wherein the non-transitory computer-readable storage medium further comprises instructions for:

determining a dynamic range of the video; and determining whether or not to enhance the video based on the dynamic range.

* * * * *